(12) United States Patent
Althaus

(10) Patent No.: US 7,500,349 B2
(45) Date of Patent: Mar. 10, 2009

(54) POWER PLANT AND OPERATING METHOD

(75) Inventor: Rolf Althaus, Feldmeilen (CH)

(73) Assignee: Alstom Technology Ltd, Baden (CH)

( * ) Notice: Subject to any disclaimer, the term of this patent is extended or adjusted under 35 U.S.C. 154(b) by 286 days.

(21) Appl. No.: 11/366,436

(22) Filed: Mar. 3, 2006

(65) Prior Publication Data

US 2006/0213183 A1     Sep. 28, 2006

Related U.S. Application Data

(63) Continuation of application No. PCT/EP2004/051819, filed on Aug. 18, 2004.

(30) Foreign Application Priority Data

| Sep. 4, 2003 | (EP) | ................................... 03103298 |
| Sep. 26, 2003 | (EP) | ................................... 03103569 |

(51) Int. Cl.
*F02C 7/10* (2006.01)
*F02G 1/00* (2006.01)

(52) U.S. Cl. .......................... 60/39.511; 60/777; 60/727

(58) Field of Classification Search .............. 60/39.183, 60/727, 777, 39.511, 723; 422/168
See application file for complete search history.

(56) References Cited

U.S. PATENT DOCUMENTS

| 3,599,427 | A |   | 8/1971 | Jones et al. | |
|---|---|---|---|---|---|
| 3,641,763 | A | * | 2/1972 | Cole | ........................ 60/39.512 |
| 4,081,958 | A | * | 4/1978 | Schelp | ..................... 60/39.511 |
| 4,202,168 | A | * | 5/1980 | Acheson et al. | ................ 60/777 |
| RE30,629 | E | * | 6/1981 | Dawson | ........................ 60/682 |
| 5,313,783 | A | * | 5/1994 | Althaus | ................... 60/39.181 |
| 5,460,784 | A |   | 10/1995 | Gillbrand et al. | |
| 5,934,063 | A | * | 8/1999 | Nakhamkin | ................... 60/773 |
| 5,974,789 | A |   | 11/1999 | Mathes et al. | |
| 6,205,768 | B1 | * | 3/2001 | Dibble et al. | ............ 60/39.511 |
| 6,269,625 | B1 | * | 8/2001 | Dibble et al. | ................. 60/777 |
| 6,584,760 | B1 | * | 7/2003 | Lipinski et al. | .......... 60/39.511 |
| 6,745,569 | B2 | * | 6/2004 | Gerdes | ......................... 60/727 |
| 6,960,840 | B2 | * | 11/2005 | Willis et al. | .................... 290/52 |

(Continued)

FOREIGN PATENT DOCUMENTS

DE     3225716 C1    6/1983

(Continued)

*Primary Examiner*—William H Rodriguez
(74) *Attorney, Agent, or Firm*—Buchanan Ingersoll & Rooney PC

(57) ABSTRACT

A power plant comprises a gas turbo group with a heat transfer apparatus, for example a recuperator for the preheating of the combustion air, arranged downstream of the turbine in the smoke gas path of the gas turbo group. A smoke gas purification catalyst is arranged downstream of at least part of the heat transfer apparatus, at a point at which the smoke gas is already cooled as a result of heat exchange to an extent such that irreversible damage to the catalyst due to overheating is avoided. On the other hand, the point is selected such that a temperature necessary for maintaining the catalytic smoke gas purification is ensured. In a preferred embodiment, a temperature measurement point is arranged, at which the temperature of the catalyst or of the smoke gas flowing into the catalyst is determined, so that this temperature can be regulated by means of suitable regulating actions.

11 Claims, 10 Drawing Sheets

U.S. PATENT DOCUMENTS

| | | | |
|---|---|---|---|
| 7,007,487 B2 * | 3/2006 | Belokon et al. | 60/777 |
| 2002/0166324 A1 * | 11/2002 | Willis et al. | 60/777 |
| 2003/0033809 A1 * | 2/2003 | Konezciny et al. | 60/772 |
| 2003/0131599 A1 * | 7/2003 | Gerdes | 60/727 |
| 2003/0167773 A1 * | 9/2003 | Mathias et al. | 60/772 |
| 2004/0103669 A1 * | 6/2004 | Willis et al. | 60/777 |
| 2005/0109034 A1 * | 5/2005 | Althaus et al. | 60/772 |

FOREIGN PATENT DOCUMENTS

| | | |
|---|---|---|
| DE | 39 32 540 A1 | 4/1991 |
| DE | 39 41 091 A1 | 6/1991 |
| EP | 0 381 236 A1 | 8/1990 |
| EP | 0 622 535 A1 | 11/1994 |
| FR | 1 563 749 | 12/1967 |

* cited by examiner

POWER PLANT AND OPERATING METHOD

TECHNICAL FIELD

The present invention relates to a power plant according to the preamble of claim 1. It relates, furthermore, to a preferred method for operating a power plant according to the invention.

PRIOR ART

In terms of adhering to the most stringent emission standards, it is known to use catalytic exhaust gas purification. However, exhaust gas purification catalysts have a comparatively narrow temperature window in which they operate effectively. When an upper temperature limit value is overshot, damage to the catalyst occurs. Below a lower temperature limit value, the smoke gas purification action decreases rapidly and may ultimately no longer be ensured.

By contrast, gas turbo groups have a wide exhaust gas temperature range. From the part load range up to full load, it is simply impossible, in the case of realistic process parameters ensuring reasonable efficiency and power data, to keep the exhaust gas temperature within a window, conducive to catalytical gas purification, of, for example, 250° C. to around 300° C. or even 350° C.

Where gas turbo groups are concerned, therefore, catalytic smoke gas purification is employed particularly in conjunction with a waste heat recovery steam generator arranged in the smoke gas path, that is to say primarily in conjunction with combined cycle plants, STIG processes or cogeneration plants. A gas turbo group with a following waste heat recovery system generator, but without exhaust gas purification, is known from EP 622535. The catalyst is then arranged within the waste heat recovery steam generator, for example in the region of an evaporator, because, of course, a temperature variable only within narrow limits and predetermined essentially by the pressure of the water in the evaporator piping prevails there. However, combined cycle plants are very costly and are worthwhile in economic terms actually only for base load operation with operating times of, for example, more than 6000 h/year near full load, for example at more than 80% of rated power. STIG processes have a very high consumption of water which also has to be treated in a complicated way. Cogeneration plants are, of course, restricted to specialized applications, because a consumer for generated steam has to be present in suitable local proximity.

On the other hand, complicated specific measures have to be taken in order to set the gas turbine smoke gases to a temperature acceptable to the catalyst.

PRESENTATION OF THE INVENTION

The invention is intended to remedy this. The object on which the invention characterized in the claims is based is to specify a power plant and a method of the type initially mentioned, which can avoid the disadvantages of the prior art. The object of the invention is to specify a power plant which, for the smoke gases of a gas turbo group, has a smoke gas purification catalyst which manages without a complicated waste heat recovery steam generator or other complicated and highly capital-intensive special measures for setting the catalyst temperature. The object of the invention is therefore, furthermore, to specify a power plant with a gas turbo group and with catalytic exhaust gas purification of the gas turbine smoke gases, which is to be installed economically even for peak load applications, in the case of planned annual operating times of less than 2000 hours and even less than 500 hours.

According to the invention, this object is achieved using the whole of the features of claim 1, and, furthermore, using a method according to the method claim.

The essence of the invention, therefore, is to arrange in the smoke gas path a heat transfer apparatus, through which the smoke gases of the gas turbo group can flow on the primary side and through which a gaseous working fluid of a heat and power process can flow on the secondary side, and to arrange the catalyst downstream of a first part of the heat transfer apparatus and, furthermore, preferably upstream of a second part of the heat transfer apparatus. When it flows through the heat transfer apparatus, the smoke gas of the gas turbo group is cooled in heat exchange with the fluid flowing on the secondary side, and the fluid flowing on the secondary side is heated in heat exchange with the smoke gas. In this case, the gradual cooling of the smoke gas when it flows through the heat transfer apparatus is utilized, and the catalyst is arranged at a point in which the temperature of the smoke gas has fallen to a value compatible with the operation of the catalyst. The catalyst is therefore arranged at a point at which the smoke gas temperature lies within a catalyst-specific temperature window; where the catalyst materials customary at the present time are concerned, in particular temperatures of around 250° C. to 300° C. or even up to around 350° C. are to be preferred.

In one embodiment, the heat transfer apparatus is subdivided into two independent units through which the flow passes in series and between which the catalyst is arranged.

The term "gaseous working fluid" is to be understood in this context as meaning the working fluid of a heat and power process which proceeds without a phase change of the working fluid.

In a first embodiment of the invention, the heat transfer apparatus is a recuperator of a gas turbo group with air preheating. The heat transfer apparatus has flowing through it on the primary side the smoke gas of the gas turbo group and has flowing through it on the secondary side, preferably in countercurrent, the combustion air which comes from the compressor and which is heated in heat exchange with the smoke gases before it is conducted into the combustion chamber for the combustion of a fuel; in a way known per se, the smoke gas which occurs is expanded in the turbine and is conducted through the primary-side flow path of the heat transfer apparatus. It is well known to a person skilled in the art that the air preheating of a gas turbo group is used preferably in the case of comparatively low pressure conditions and associated moderate final compressor temperatures, and/or when the final compressor temperature is correspondingly low due to intermediate cooling in the compressor or to the use of liquid injection, proposed, for example, in FR 1,563,749, in the compressor. Often, in these cases, it is possible, simply on account of the laws of thermal dynamics, to ensure a final compressor temperature which is compatible with a permissible and sufficient catalyst inlet temperature of the smoke gas. The recuperator must then be dimensioned such that the smoke gas is cooled essentially to the final compressor temperature; in this case, the catalyst is arranged in the primary-side flow path of the heat transfer apparatus at the downstream end of the heat transfer apparatus or downstream of this. Further heat transfer means for utilizing the remaining smoke gas heat may be arranged downstream of the catalyst.

In a further embodiment of this solution, means for determining the smoke gas temperature at the catalyst inlet or the catalyst temperature are arranged. This temperature can be regulated within certain limits by the adjustment of an adjustable compressor front guide blade cascade and, if appropriate, by means of additional firing arranged downstream of the turbine and upstream of the recuperator.

In a further preferred embodiment of the invention, the heat transfer apparatus is a heater of a pressure accumulator system, in particular of an air accumulator system. The pressure accumulator system in this case comprises a pressure accumulator for an accumulator fluid and an accumulator fluid expansion engine, in particular an expansion turbine, via which compressed gaseous accumulator fluid, in particular compressed air, stored in the pressure accumulator can be expanded so as to perform work. In this case, a heating of the accumulator fluid prior to expansion ensures a higher specific enthalpy gradient available across the expansion machine and consequently a better utilization of the stored fluid. In a preferred variant, preheating takes place by indirect heat exchange, because, in this case, the expansion turbine is not acted upon by aggressive smoke gases. Due to the low outlet temperature of the accumulator fluid from the pressure accumulator, a pressure accumulator system is most particularly suitable for utilization at a low temperature level of occurring heat and therefore allows a very good utilization of the exhaust gas heat of the gas turbo group. If this waste heat alone is utilized, then the temperature of the accumulator fluid at the inlet of the accumulator fluid expansion machine generally remains limited to markedly below 600° C. It is then possible, for example, to use a standard steam turbine as a pressure accumulator expansion machine.

From the point of view of economic considerations, therefore, independently of the heat source used, a preferred embodiment is often one in which the accumulator fluid is heated indirectly in heat exchange and the accumulator fluid temperature is limited to a permissible maximum value, so that expansion machines can be used which dispense with cooling, materials resistant to high temperature and protective measures against the aggressive action of the hot gases.

In connection with the air accumulator system, as described, the catalyst is arranged in the smoke gas path of the gas turbo group within the heat transfer apparatus, downstream of a first part of the heat transfer apparatus and upstream of a second part of the heat transfer apparatus. Arrangement takes place at a point at which a favorable temperature window is to be expected during the nominal operation of the power plant.

So that this can be ensured, according to a preferred variant, means are provided in order to measure, and preferably regulate, the temperature of the smoke gas essentially directly upstream of the catalyst or the catalyst temperature directly. In one embodiment of the invention, the mass flow extracted from the compressed air accumulator is controlled such that this temperature is set at a desired value or is regulated within a desired value interval. Regulation may take place, for example, by means of a continuous controller or by means of a two-position controller, also in terms of adaptive control constraint regulation. The temperature controller used is connected up with the temperature as controlled variable and with the position of a shutoff and/or throttle member for the accumulator fluid as controlling variable.

Measurement and monitoring of the catalyst inlet temperature are also advantageous in other operating methods, in order, when permissible limits are overshot or undershot, to trigger intercepting actions which, for example, can avoid irreversible damage to the catalyst.

In a further embodiment of the invention, a temperature measurement point is arranged in the smoke gas path downstream of the heat transfer apparatus. In a preferred type of operation, the exhaust gas temperature measured there is used as a controlled variable for a temperature controller which, by actions on the throttle member, varies the fluid mass flow such that the measured exhaust gas temperature remains at a desired value or within a desired value interval. For example, the exhaust gas temperature is set such that it lies above a dew point temperature by the amount of a safety margin; this allows the best possible utilization of the waste heat potentials, while at the same time ensuring safety against the exhaust gas undershooting the dew point temperature. In this case, it is, of course, advantageous likewise to suitably monitor the catalyst temperature in accordance with the statements made above and at least to regulate it in terms of adaptive control constraint regulation.

Even in other operation modes, it is advantageous to measure the exhaust gas temperature downstream of the heat transfer apparatus and to include this in plant control safety logics, in such a way that, when a minimum value, which may be predetermined as a function of the fuel used, is undershot, corresponding safety measures are triggered, so that smoke gas components are prevented from undershooting the dew point which would otherwise lead to serious corrosion damage.

In a development of the power plant, a heat supply device, in particular additional firing, is arranged in the smoke gas path of the gas turbo group upstream of the heat transfer apparatus. Consequently, on the one hand, the heat available for the air accumulator process can be decoupled most highly effectively from the power of the gas turbo group. For this purpose, a power controller of the accumulator fluid expansion machine is connected up with the useful power of the pressure accumulator expansion machine as controlled variable and with the position of a fuel mass flow actuating member of the heat supply device as controlling variable. Preferably, at the same time, the actuating member of the accumulator fluid mass flow is activated in the way described above by a temperature controller for regulating and/or limiting the catalyst and/or exhaust gas temperature.

In a further embodiment of the invention, in conjunction with this heat supply device, means for determining the catalyst temperature and/or the smoke gas temperature are arranged essentially directly upstream of the catalyst, for example at the catalyst inlet; a temperature controller is connected up with the temperature measured there as controlled variable and with the position of a fuel mass flow actuating member of the heat supply device as controlling variable. The additional heat supply to the smoke gas is therefore controlled as a function of the catalyst temperature, in order to set this at a desired value or within a desired value interval. This regulation may also be used as adaptive control constraint regulation, in order to avoid an overshooting or undershooting of permissible temperature limits of the catalyst.

In conjunction with this, advantageously, both the catalyst temperature and the exhaust gas temperature in the smoke gas path can be regulated independently of one another downstream of the heat transfer apparatus. In this case, preferably, the accumulator fluid mass flow actuating member is activated as a function of the exhaust gas temperature, as described above. The fuel mass actuating member for the heat supply device is controlled, as described above, in order to regulate the catalyst temperature.

Alternatively, it is also possible to control the accumulator fluid mass flow via the power controller as a function of the power of the accumulator fluid expansion machine and, at the same time, the additional heat supply to the smoke gas, in particular firing power, as a function of the catalyst inlet temperature or of the exhaust gas temperature via a temperature controller.

In a further embodiment, the temperature of the accumulator fluid downstream of the heat transfer apparatus is determined, for example by a measurement in the accumulator fluid flow path, or, equivalently, as is well known in steam turbine technology, the flange temperature of the inlet flange of the accumulator fluid expansion machine is measured. A temperature controller is connected up with the measured temperature as controlled variable and with the position of the fuel mass flow actuating valve of the heat supply device as controlling variable. The temperature of the accumulator fluid is thereby set at a desired value or within a desired value interval. Alternatively, in any event, it is advantageous if an adaptive control constraint regulation of this temperature is implemented in a suitable way, in order to ensure adherence to a permissible maximum temperature.

In one embodiment of the invention, the power plant comprises a pressure accumulator system, the gas turbo group is connected to a generator which on a second shaft end carries an automatically acting coupling, via which the expansion machine can likewise be connected to the generator. This arrangement, in which a gas turbo group and a second engine drive a common generator, is known from combined cycle plants, in which a steam turbine can be mechanically connected via an automatic coupling to a generator common to the gas turbo group. This type of construction may also be employed advantageously in a power plant which has a gas turbo group and an expander for an accumulator fluid. As mentioned, the gas turbo group and the generator are connected fixedly, while the automatic coupling acts in such a way that it has a freewheel function insofar as the rotation speed of the expander-side drive shaft is below that of the generator, and a torque is transferred only when the rotational speeds are identical.

BRIEF DESCRIPTION OF THE DRAWING

The invention is explained in more detail below by means of exemplary embodiments illustrated in the drawing. Elements not directly necessary for understanding the invention are omitted. The exemplary embodiments are to be understood purely instructively and are not to be called upon in order to restrict the invention characterized in the claims.

WAYS OF IMPLEMENTING THE INVENTION

Figure 1:
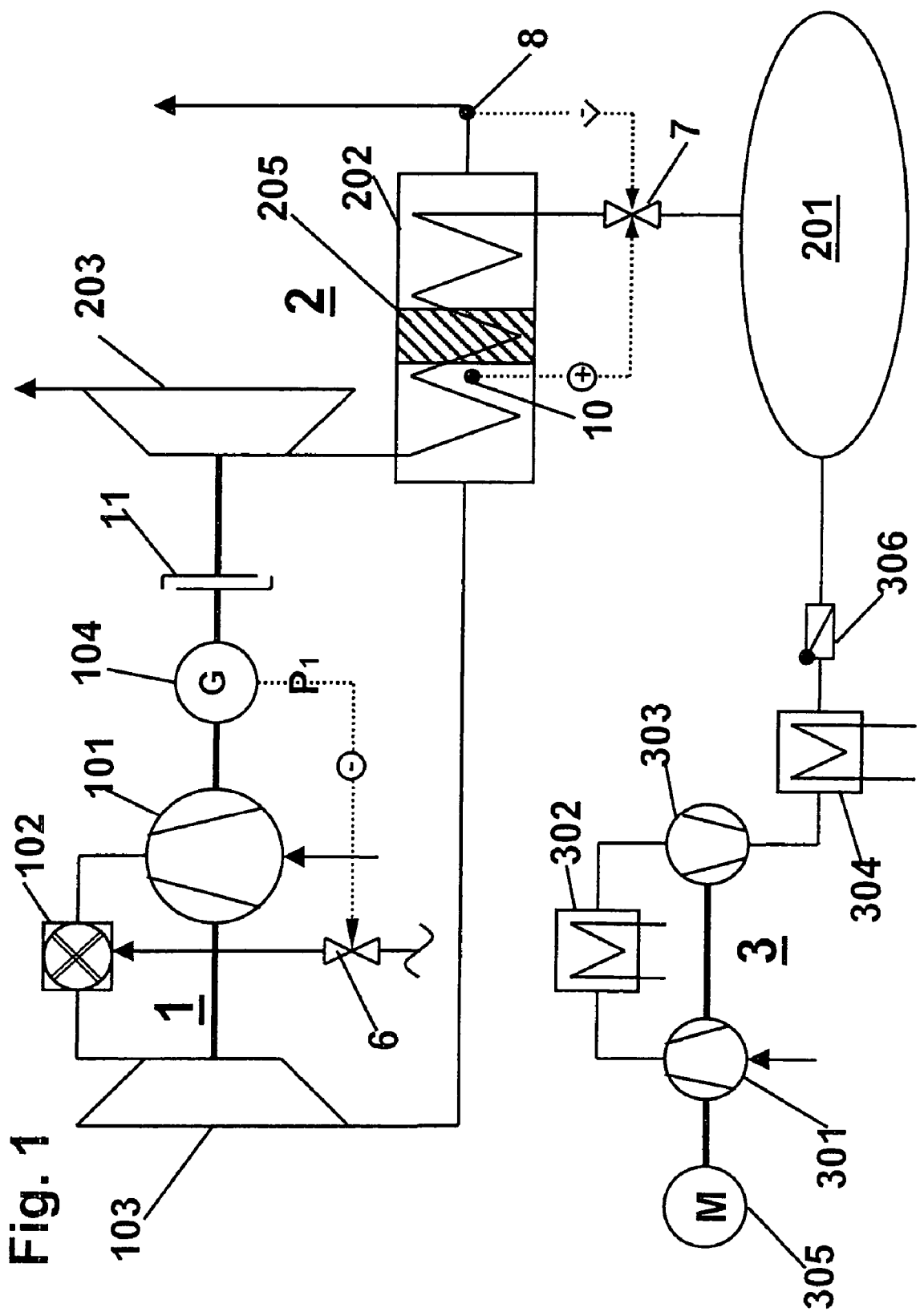
FIG. 1 illustrates on embodiment of the power plant.

A first embodiment of the invention is illustrated in FIG. 1. The power plant comprises a gas turbo group 1, an accumulator system 2 and a charging unit 3. The gas turbo group 1, illustrated diagrammatically, comprises a compressor 101, a combustion chamber 102, a turbine 103 and a generator 104. The generator may often also be operated motively as a starting device for the gas turbo group. The gas turbo group is any gas turbo group such as is commercially available, which also includes the possibility of multishaft installations or of gas turbo groups with sequential combustion, that is to say with two turbines flow-connected in series and with a combustion chamber arranged between them. Such a gas turbo group became known from EP 620 362. A gear unit may likewise also be arranged between the output shaft of the gas turbo group and the generator; the illustrated type of construction of the gas turbo group is not to be understood restrictively. In a way known per se, ambient air is compressed in the compressor 101, heat is supplied to the compressed air in the combustion chamber 102 and the pressurized hot gas which occurs is expanded in the turbine 103 so as to give a power output. The expanded smoke gas downstream of the turbine has a temperature which may easily amount to well above 550° C. and which may fluctuate considerably over the power range of the gas turbo group. It is therefore impossible per se, without further precautions, to arrange an exhaust gas purification catalyst directly in the smoke gas path of the gas turbo group. The turbine drives the compressor 101 and the generator 104. The generator 104 generates a useful power $P_1$ which is detected and utilized for regulating the power of the gas turbo group, this being illustrated in highly simplified form. When the power, as controlled variable, falls, the fuel mass flow actuating member 6 is opened. Such power regulation, of course, also comprises desired/actual value comparisons, limiters for temperatures and pressures, and much more, which, however, is familiar to a person skilled in the art and therefore has not been illustrated for the sake of clarity. Furthermore, the power plant illustrated comprises an accumulator system 2, the core elements of which are the pressure accumulator 201 and the accumulator fluid expansion engine 203. In the present case, the accumulator fluid expansion machine is illustrated as a turbine; here, too, in principle, a screw expander or the like could be employed. The accumulator fluid expansion turbine used may be, for example, a commercially available standard steam turbine which requires only minor modifications; the pressure accumulator fluid flowing through is then, in light of a long useful life, preferably air or another nonaggressive gas, with inlet temperatures of a maximum of around 550° C. to 650° C. The pressure accumulator can be charged with compressed air in a way known per se, this taking place preferably at times of low electricity demand and low electricity market prices. In the example, a charge unit 3 is illustrated which contains a first compressor 301, an intermediate cooler with dehumidifier 302, a second compressor 303 and a second air cooler/dehumidifier 304. The drive takes place by means of the motor 305. When the compressors are in operation, compressed air is conveyed into the accumulator volume 201; when the charge unit 3 is at a standstill, a nonreturn member 306 prevents a backflow of air. A shutoff and/or throttle member 7 regulates the outflow of accumulator fluid from the pressure accumulator 201 to the accumulator fluid expansion turbine 203. Fluid flowing out of the pressure accumulator is expanded in the turbine 203 so as to give power output. The output shaft of the accumulator fluid expansion turbine can be connected to the generator 104 via an automatically acting coupling. Insofar as the rotational speed of the generator is higher than that of the output shaft leading from the turbine 203, the coupling 11 performs a freewheel function; when the rotational speed of the output shaft is synchronous, a torque is transferred from the expansion turbine 203 to the generator 104.

Of course, a gear unit may also be arranged between the output shaft and the accumulator fluid expansion turbine; particularly where small construction sizes are concerned, expansion machines are often used which rotate at a higher speed than the generator and the rotational speed of which therefore has to be reduced to a rotational speed synchronous with the generator. Arranged in the accumulator fluid flow path between the compressed air accumulator 201 and the turbine 203 is a heat transfer apparatus 202, via which heat can be transferred to the accumulator fluid prior to expansion in the turbine 203. The low outlet temperature from the compressed air accumulator makes the pressure accumulator system highly attractive for the utilization of heat occurring at a low temperature level, such as, for example, solar heat or even the waste heat from a gas turbo group or from another thermal engine. The heat transfer apparatus is therefore arranged in the smoke gas path of the gas turbo group 1, and the smoke gas flows through the heat transfer apparatus on a primary side, while the pressurized fluid from the pressure accumulator flows through the heat transfer apparatus on the secondary side in countercurrent to the smoke gas. Thus, when it flows through the heat transfer apparatus, the fluid flowing out of the compressed air accumulator is heated, with the waste heat from the gas turbo group being utilized, whereas the smoke gases are cooled. A best waste heat utilization occurs when the smoke gases are cooled as far as possible, in which case an undershooting of the dew point of the smoke components is to be avoided; this may otherwise result in serious corrosion damage, particularly during the combustion of sulfur-containing fuels, such as oil. The smoke gas, when it flows through the heat transfer apparatus 202, is gradually cooled and, downstream of a first flow stage, runs through a temperature range which is beneficial for operating a smoke gas purification catalyst. A smoke gas purification catalyst 205 is arranged in the smoke gas path at a corresponding point of the heat transfer apparatus, downstream of a first part of the heat transfer apparatus and upstream of a second part of the latter. The arrangement may be selected according to the following criteria: in the case of a nominal design of the power plant, the components and mass flows are dimensioned such that the temperature of the accumulator fluid, when it emerges from the heat transfer apparatus, lies only a little, for example 30° C., below the inlet temperature of the smoke gas. On the other hand, in light of a best exhaust gas heat utilization, the smoke gas is to be cooled as near as possible to the dew point. This results in a design-related division of the temperature gradient along the smoke gas path within the heat transfer apparatus. It is thus possible to determine, within the heat transfer apparatus 202, a region in which the catalyst 205 can be favorably arranged, taking into account possible deviations from the design-related operating state. Furthermore, within the heat transfer apparatus 202, a temperature measurement point 10 is arranged, via which the smoke gas temperature is determined essentially directly upstream of the catalyst 205 or the material temperature of the catalyst itself is determined. A temperature controller is connected up with the temperature measured there, as controlled variable and with the position of the accumulator fluid mass flow actuating member 7 as the controlling variable. If the measured temperature overshoots a desired value or an upper threshold value, the actuating member 7 is opened further, whereupon the mass flow of accumulator fluid rises. On account of the increased mass flow of the heat-absorbing fluid, the temperature gradient of the smoke gas rises in the first part of the heat transfer apparatus and the temperature at the measurement point 10 falls. If, conversely, a desired value or a lower threshold value is undershot, the actuating member 7 is closed further, whereupon the mass flow of the accumulator fluid falls. On account of the reduced mass flow of the heat-absorbing fluid, the temperature gradient of the smoke gas in the first part of the heat transfer apparatus decreases, and the temperature at the measurement point 10 rises. The catalyst temperature can thus be set most highly efficiently at a desired value or within a desired value range. The variation in the accumulator fluid mass flow, of course, also entails a change in the power output of the turbine 203. This change is compensated by means of the power controller which regulates the overall power of the generator 104 and increases or decreases the fuel mass flow to the combustion chamber 102 as a function of a control deviation of the power $P_1$. This, of course, also has effects on the temperature and the mass flow of the smoke gas and consequently on the catalyst temperature, although this is compensated by means of the temperature control loop described above; in the case of a suitable design of the regulating parameters, a stable state is very quickly established here. Furthermore, a temperature measurement point 8 for measuring the exhaust gas temperature is arranged downstream of the heat transfer apparatus 202 in the smoke gas flow path. This temperature measurement point is used, in terms of adaptive control constraint regulation, in such a way that the actuating member 7 is closed or the opening of the latter is limited, as soon as a lower temperature limit value at which the condensation of aggressive smoke gas components must be expected is undershot. The corresponding interaction with the regulation of the catalyst temperature must be ensured by means of suitable protective logics.

In a further operational variant, not illustrated, the exhaust gas temperature determined by means of the measurement point 8 is regulated to a desired value or within a desired value interval by actions on the position of the accumulator fluid mass flow actuating member 7, and adherence to an absolutely permissible temperature window for the catalyst temperature determined by means of the measurement point 10 is monitored in terms of a protective circuit. Moreover, it is highly advantageous and is familiar to a person skilled in the art if the temperature of the accumulator fluid at the outlet from the heat transfer apparatus or at the inlet into the accumulator fluid expansion turbine 203 or the temperature at the inlet flange of the accumulator fluid expansion turbine is monitored in a way not illustrated, but familiar to a person skilled in the art, and, in the event of an overshooting of a permissible maximum, suitable measures are carried out so as not to put the integrity of the turbine 203 at risk.

The power plant illustrated in FIG. 1, in which the gas turbo group 1 and the pressure accumulator system 2 act on a common generator, can most particularly advantageously be started up entirely without extraneous energy supplied from outside, on the precondition that the pressure accumulator 201 is at least partially charged. For this purpose, when the plant is completely at a standstill, the throttle member 7 can, if necessary, be opened by hand. Pressure accumulator fluid flows through the accumulator fluid expansion machine and drives the latter. In this case, the automatic coupling 11 ensures the transmission of torque from the accumulator fluid expansion machine 203 to the shafting of the gas turbo group. The accumulator fluid expansion machine can thus be used as a starting device for the gas turbo group: the gas turbo group is accelerated by the expansion turbine up to the ignition rotational speed and is then accelerated further to the nominal rotational speed, in such a way that the gas turbo group is capable of driving the generator again in power output operation.

Figure 2:
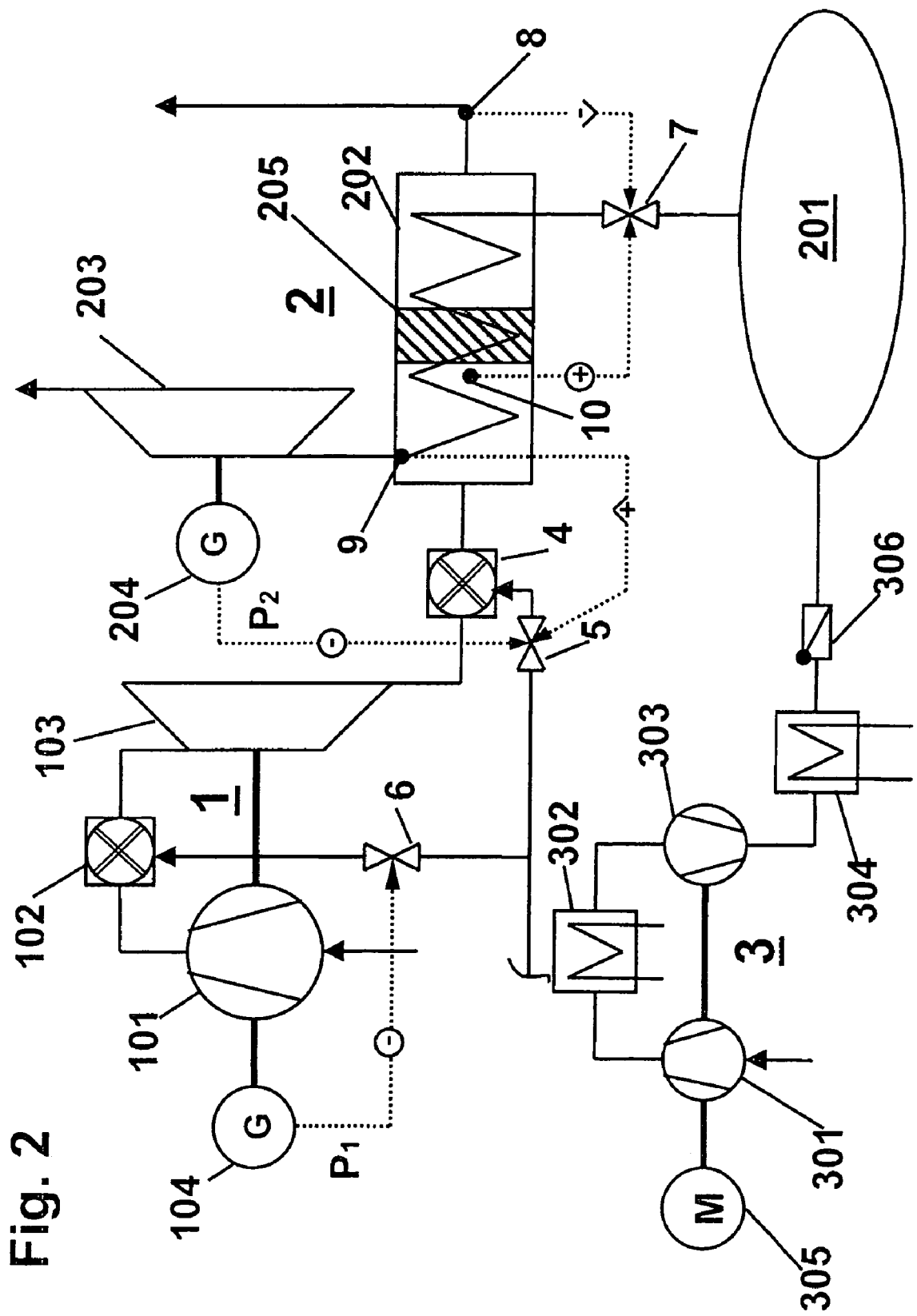
FIG. 2 illustrates another embodiment of the power plant.

According to a second embodiment which is illustrated in FIG. 2, additional firing 4 is arranged upstream of the heat transfer apparatus 202 in the smoke gas path of the gas turbo group. A fuel mass flow actuating member 5 of the additional firing 4 is controlled with the power $P_2$ of the generator 204 of the pressure accumulator expansion turbine 203 as controlled variable. An increase in the firing power of the additional firing leads first to a rise in the temperature at the catalyst inlet and, as a consequence of the temperature regulation mechanism described above, to a rise in the mass flow through the pressure accumulator system. The embodiment illustrated has, furthermore, explicitly illustrated temperature measurement points 8 and 9, at which the temperature of the smoke gas at the outlet of the heat transfer apparatus 202 or the temperature of the accumulator fluid at the outlet from the heat transfer apparatus 202 or at the inlet into the accumulator fluid expansion turbine 203 are determined. Both are used, in terms of safety circuits, as controlled variables for adaptive control constraint regulations. An overshooting of a permissible maximum value of the temperature measured at the measurement point 9 limits the position of the fuel mass flow actuating member 5 or closes this at least partially. An undershooting of a permissible minimum temperature at the measurement point 8 causes a limitation or closing of the throttle member 7. It is clear that the regulation levels must be graded hierarchically in that an adaptive control constraint regulation provided as a safety circuit has priority over the temperature and power regulation mechanisms described above.

Figure 3:
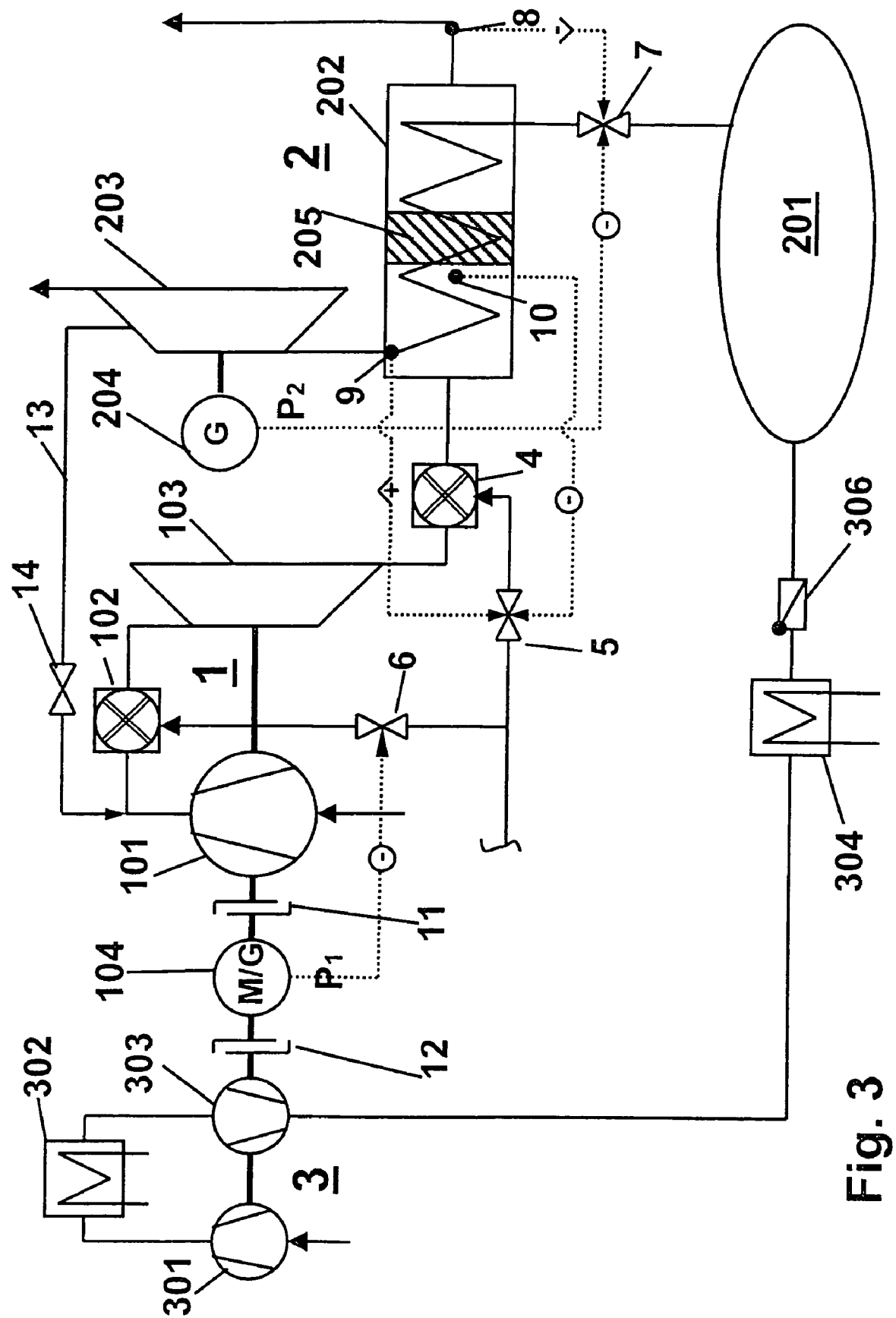
FIG. 3 illustrates another embodiment of the power plant.

The embodiment illustrated in FIG. 3 differs, with regard to regulation, in that the catalyst inlet temperature is employed as a controlled variable for the fuel mass flow actuating member 5, while the throttle member 7 is activated with the power $P_2$ as controlled variable. Furthermore, the charge unit 3 can be coupled mechanically to the generator 104 of the gas turbo group 1. In the embodiment illustrated, the generator 104 can be operated electromotively to full value and to that extent, in this connection, is designated most generally as an electric machine or motor/generator unit. The connection to the shaft of the gas turbo group 1 can be made via a switchable coupling 11; there may also be a fixed coupling here. At a second shaft end, the motor/generator unit 104 can be coupled to the charge unit 3 via a switchable coupling 12. In straightforward charging operation, the connection of the coupling 12 is closed, and the connection of the coupling 11 is opened; the motor/generator unit 104 is operated purely motively. In straightforward power operation, the coupling 11 is closed and the coupling 12 is opened; the motor/generator unit is driven by the gas turbo group 1 and operates purely as a generator. In addition, there is an advantageous type of operation in which both couplings are closed. The electric machine 104 can then assume various operating states from motive to generator operation, and there can be a continuous variation between operation with power consumption and operation with power output. This type of operation is suitable most pre-eminently for varying the phase of the electric machine 104 and consequently, in the preferred way, for implementing reactive power compensation of a connected electricity network. Furthermore, the power plant has an overflow line 13 with a shutoff and throttle member 14. Via the overflow line, fluid can be branched off from the pressure accumulator process and supplied, downstream of the compressor 101 and upstream of the combustion chamber 102 of the gas turbo group 1, to the latter. A higher mass flow is consequently available for combustion and expansion in the gas turbo group than the compressor 101 has to convey, thus affording further power potentials. The figure illustrates extraction in an intermediate expansion stage of the accumulator process. The selection of the suitable branch-off point depends particularly on the nominal pressure ratio of the accumulator fluid expansion turbine 203; the extraction pressure should be higher than the final compressor pressure of the gas turbo group, but should not exceed this too greatly, so that any unnecessarily high throttling losses do not have to be taken into account. Extraction in the heat transfer apparatus or between the heat transfer apparatus 202 and the pressure accumulator expansion turbine 203 is also possible. It is advantageous, furthermore, if the extraction point is selected such that the temperature of the extracted fluid corresponds at least approximately to the temperature at the compressor outlet of the gas turbo group 1.

Figure 4:
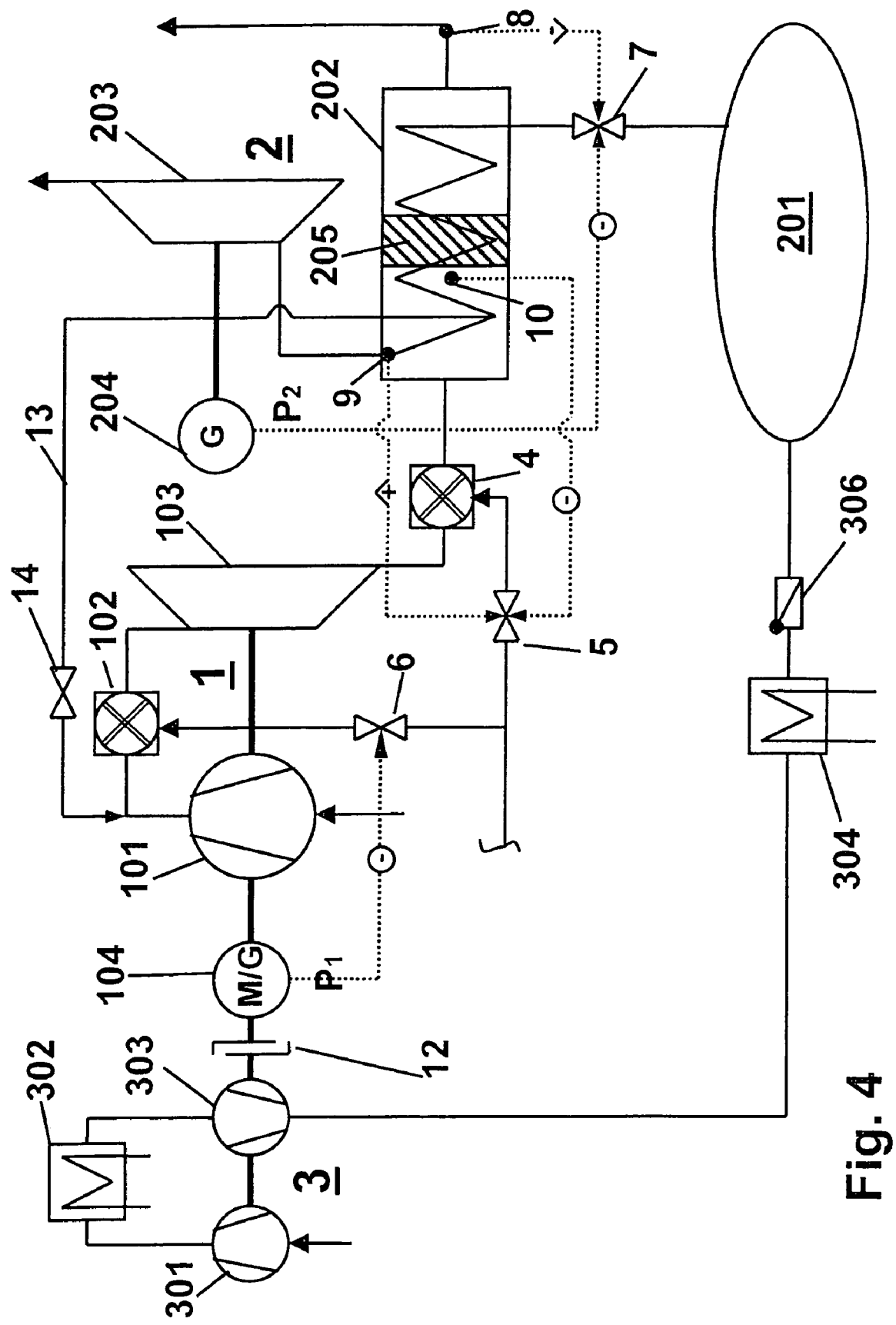
FIG. 4 illustrates another embodiment of the power plant.

An embodiment in which the overflow line branches off in the heat transfer apparatus is illustrated in FIG. 4. The extraction point is arranged upstream of the catalyst in the flow direction of the smoke gas, in such a way that the temperature of the pressure accumulator fluid at this point lies in the range of preferably 350° C. to 450° C., in the case of high pressure conditions of the gas turbo group even around 500° C. or above. This temperature is therefore generally higher than the temperature at the catalyst inlet, thus resulting in the illustrated preferred arrangement of the extraction point. Furthermore, the electric machine 104 is coupled directly to the shaft of the gas turbo group. In this case, it is not absolutely necessary for the machine 104 to be capable of being operated motively to full value.

The following figures illustrate types of operation of the power plant according to the invention, in which an explicit regulation of the power output of the pressure accumulator system is dispensed with in the interests of thermodynamic optimization. The power output of the pressure accumulator system is then established as a consequence of thermodynamic parameters.

This is most particularly suitable also in conjunction with the type of construction illustrated in FIG. 1, in which the gas turbo group 1 and the expansion machine 203 of the pressure accumulator system 2 act on a common generator.

Figure 5:
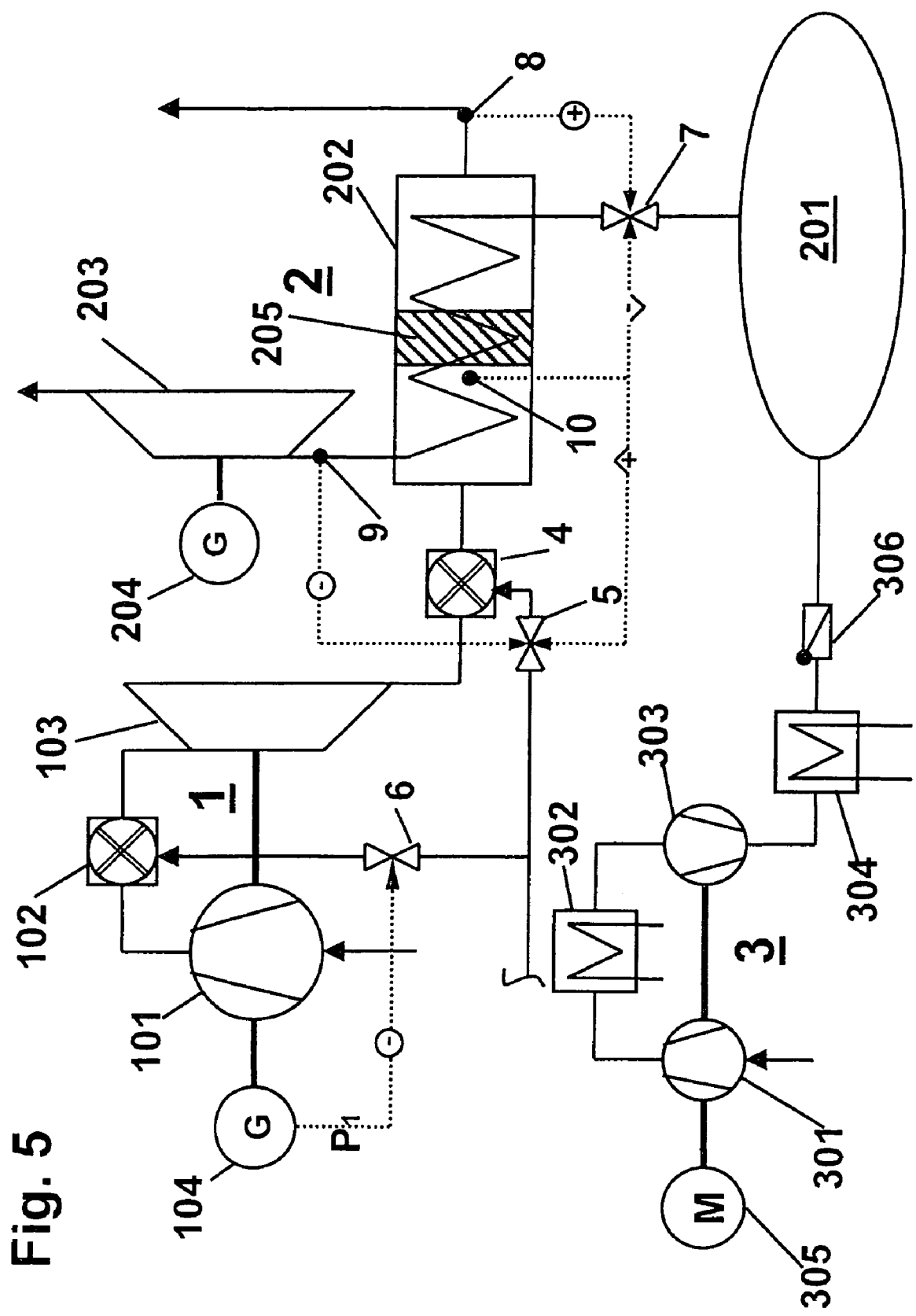
FIG. 5 illustrates another embodiment of the power plant.

In the embodiment according to FIG. 5, the smoke gas temperature downstream of the heat transfer apparatus is measured as exhaust gas temperature at a temperature measurement point 8. At a temperature measurement point 9, a temperature of the accumulator fluid at the inlet into the accumulator fluid expansion turbine 203 is measured; equivalently, for example, a temperature of the inlet flange may also be measured. The position of the fuel mass flow actuating member 5 of the additional firing device 4 is activated with the accumulator fluid turbine inlet temperature as controlled variable. A regulation takes place such that the temperature of the inlet into the accumulator fluid expansion turbine 203 is always maintained at a maximum; in this case, as already described repeatedly, continuous control or discontinuous control, in particular two-position control, may be employed. The specific enthalpy gradient across the accumulator fluid expansion turbine 203 is thus highest, and the fluid stored in the accumulator volume 201 is utilized in the best possible way for obtaining useful power. At the same time, the mass flow extracted from the accumulator volume 201 is set via actions on the position of the throttle member 7, in such a way that the exhaust gas temperature, which is measured by means of the measurement point 8, is maintained at a lowest permissible value which lies, for example, above the dew point temperature of a smoke gas component by the amount of a safety margin of 20° C. Ensuring the lowest possible exhaust gas temperature ensures the lowest possible exhaust gas heat losses and the best possible utilization of the smoke gas heat. Temperature monitoring of the catalyst 205 takes place by means of the temperature measurement point 10. When a temperature overshooting an upper limit permissible in the interests of system integrity is observed there, action is taken, in terms of adaptive control constraint regulation, on the fuel mass flow actuating member 5 and the opening of the latter is limited or the actuating member is even closed a little way. In the interests of a protective circuit, of course, this regulating action has priority over the regulation of the accumulator fluid turbine inlet temperature. If the temperature of the measurement point 10 falls below a value which can ensure a minimum purification function of the catalyst, the accumulator fluid mass flow is reduced, and consequently the lowering of the smoke gas temperature from the inlet of the heat transfer apparatus as far as the catalyst is reduced, and, as a consequence, the catalyst temperature is raised again. By contrast, the temperature of the measurement point 8 and consequently the exhaust gas heat losses also rise; in the interests of a protective circuit, however, the adaptive control constraint regulation of the catalyst temperature has priority. As is clearly evident, the adaptive control constraint regulation of the catalyst temperature is implemented such that regulating actions always take place on the safe side in the interests of the integrity of the plant as a whole; although the thermodynamic data are impaired, this is nevertheless reversible, and the protective actions cannot lead to harmful consequences on other components of the power plant. This operation is designated as operation optimized in terms of accumulator fluid utilization and of exhaust gas heat. The power of the pressure accumulator system arises from the occurring specific enthalpy gradient across the pressure accumulator expansion turbine 203 and from the mass flow of the accumulator fluid.

It would also be possible, in principle, to regulate the temperature of the measurement point 9 by a variation of the accumulator fluid mass flow, with the position of the throttle member 7 as controlling variable, and, conversely, to regulate the exhaust gas temperature at the measurement point 8 by actions on the fuel mass flow actuating member. It is clearly evident, however, that, in the example described in connection with FIG. 5, the dynamics of the controlled systems can be grasped in a substantially simpler way, and therefore the control proposed there is to be preferred.

Figure 6:
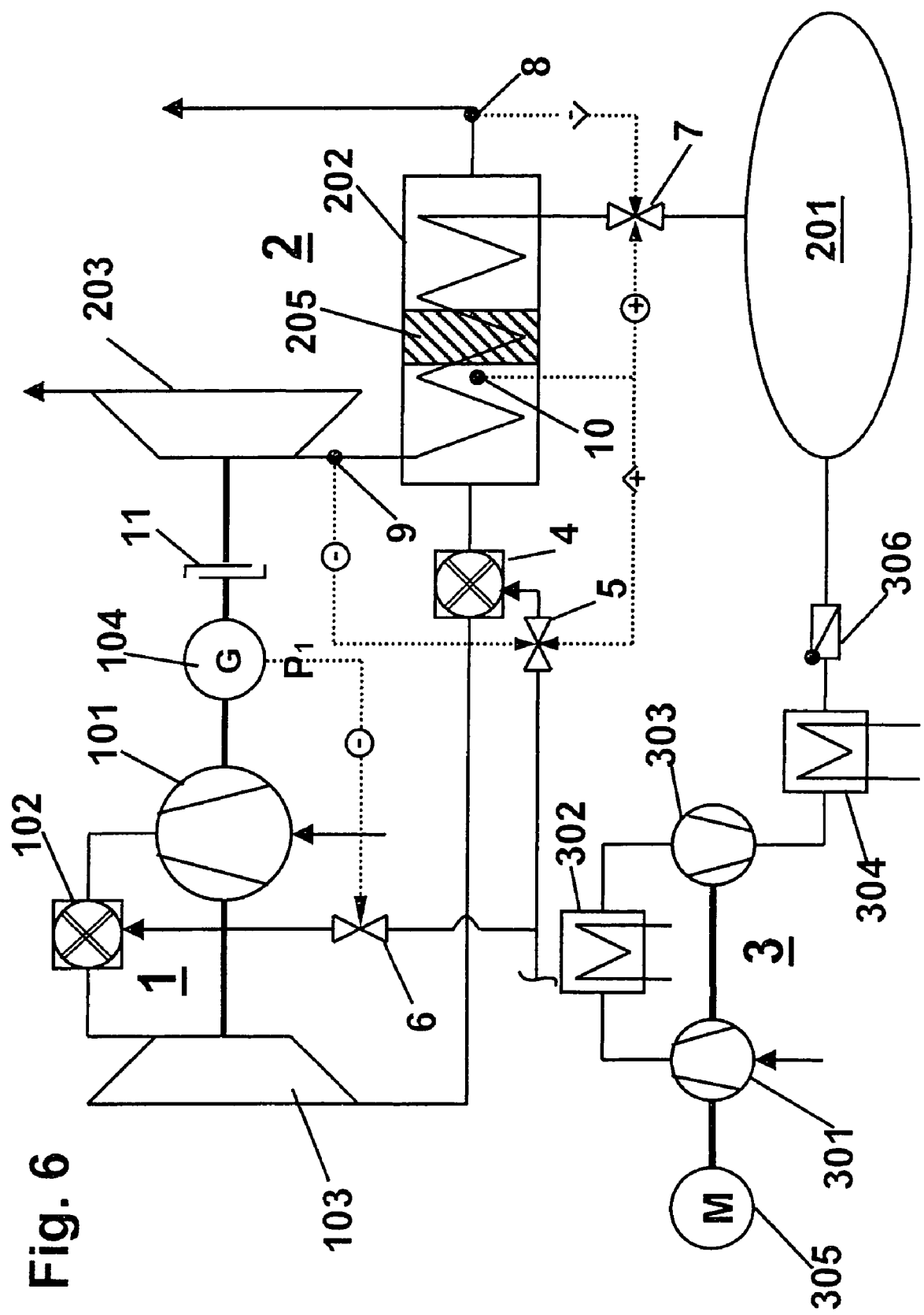
FIG. 6 illustrates another embodiment of the power plant.

According to the exemplary embodiment illustrated in FIG. 6, the temperature of the accumulator fluid at the inlet into the turbine 203, measured by means of the measurement point 9, is regulated, the position of the fuel mass flow actuating member being the controlling variable, and at the same the catalyst temperature or the smoke gas temperature upstream of the catalyst, measured by means of the measurement point 10, is regulated, the position of the accumulator fluid mass flow actuating member 7 being the controlling variable. At the same time, with a view to protective circuits, adaptive control constraint regulations of the catalyst temperature or of the smoke gas temperature upstream of the catalyst and of the exhaust gas temperature detected at the measurement point 8 are implemented. A limitation of the position of the fuel mass flow actuating member 5, with the temperature of the measurement point 10 as controlled variable, prevents an overheating of the catalyst 205. A limitation of the position of the actuating member 7, with the exhaust gas temperature as controlled variable, prevents an undershooting of the dew point in the smoke gas downstream of the heat transfer apparatus. This regulation ensures a maximum specific enthalpy gradient across the pressure accumulator expansion turbine 203 and at the same time the best possible catalyst action. This operation is accordingly designated as operation optimized in terms of accumulator fluid utilization and of catalyst.

Figure 7:
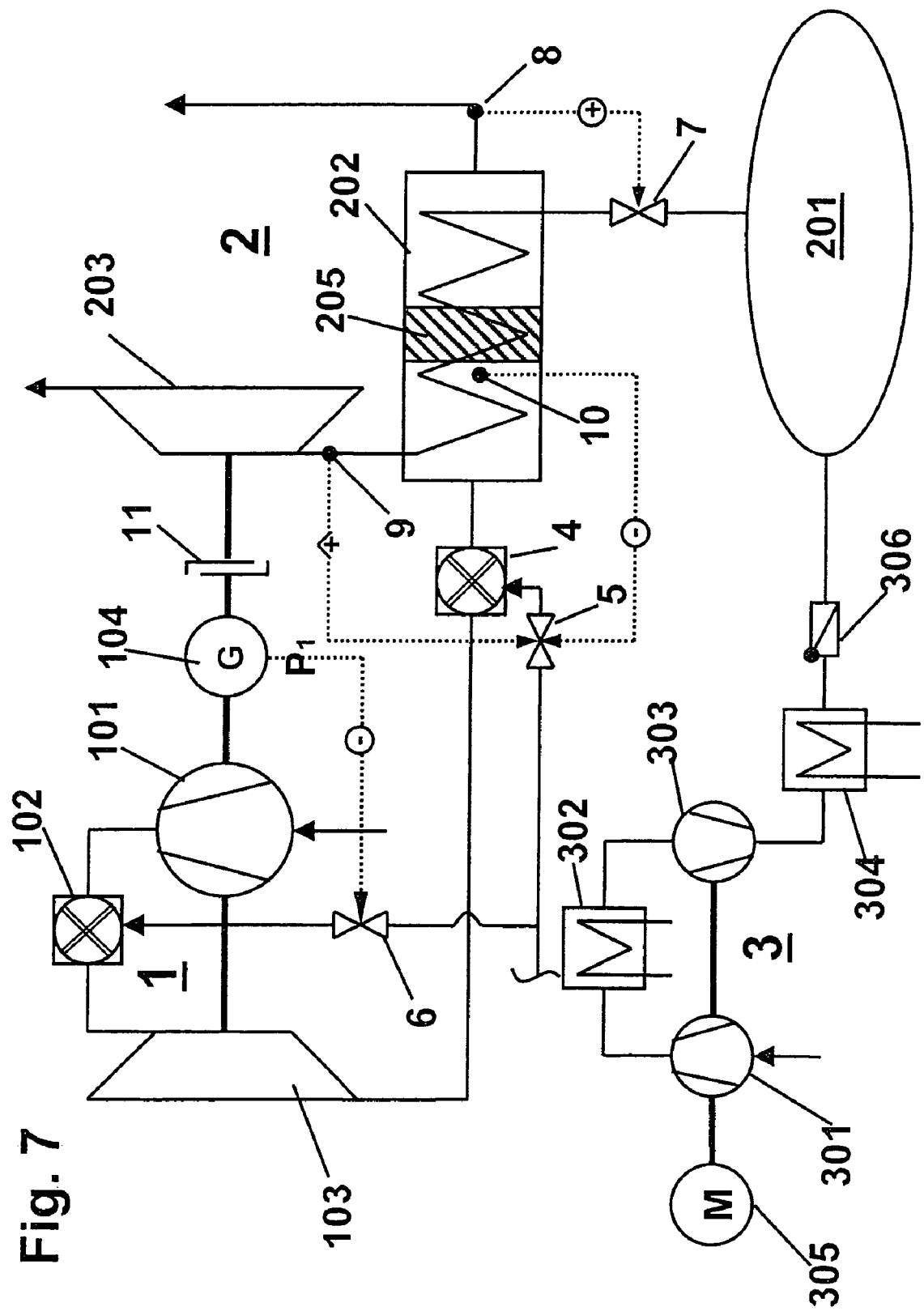
FIG. 7 illustrates another embodiment of the power plant.

According to FIG. 7, the temperature at the measurement point 10 is regulated, with the position of the fuel mass flow actuating member 5 of the additional firing device 4 as controlling variable. The exhaust gas temperature is regulated with the position of the throttle member 7 as controlling variable. It is consequently possible simultaneously to set an optimum catalyst temperature and the lowest possible exhaust gas temperature. This is designated as operation optimized in terms of catalyst and of exhaust gas heat. Furthermore, an adaptive control constraint regulation of the accumulator fluid turbine inlet temperature, measured by means of the measurement point 9, is provided, in that, where appropriate, the opening of the fuel mass flow actuating member 5 is limited with a view to a protective circuit.

Figure 8:
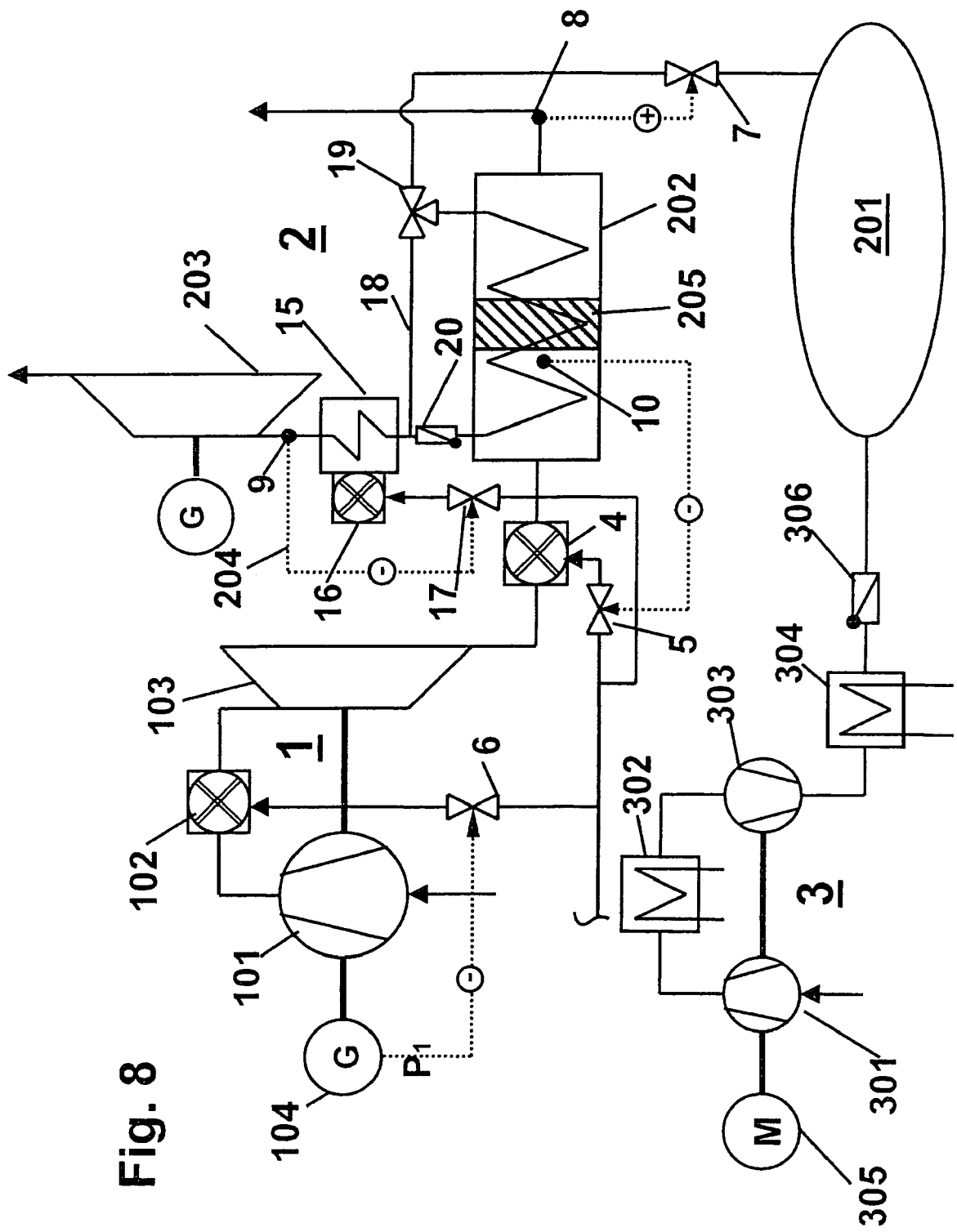
FIG. 8 illustrates another embodiment of the power plant.

In the embodiment according to FIG. 8, a heat exchanger 15 with external firing 16 is arranged downstream of the heat transfer apparatus 202 in the flow path of the accumulator fluid. Here, too, of course, a firing device may be arranged directly in the accumulator fluid flow path; as mentioned many times above, however, this has consequences for the operation or selection of the following accumulator fluid expansion machine. In the exemplary embodiment, the supply of fuel to the external firing 16 is regulated, by means of actions on the fuel mass flow actuating member 17, to keep the inlet temperature of the accumulator fluid expansion machine 203 constant. The control of the supply of fuel to the additional smoke gas firing and of the accumulator fluid mass flow takes place in a way described above, with the catalyst temperature or catalyst inlet temperature and the exhaust gas temperature as controlled variables. Furthermore, a bypass line 18 of the accumulator fluid flow path is arranged. By means of the directional valve 19, the accumulator fluid mass flow can be conducted selectively through the secondary side of the heat transfer apparatus 202 or through the bypass line. A nonreturn member 20 prevents a backflow of the fluid routed via the bypass line 18 into the heat transfer apparatus 202. This gives the plant most outstanding emergency current generation properties: in the event of the failure of the gas turbo group 1, accumulator fluid is conducted to the accumulator fluid expansion machine 203. The expansion machine is consequently capable of driving the generator 204, and therefore current can be generated. In the event of a failure of the heat transfer apparatus 202, a supply of heat to the accumulator fluid can take place in the heat exchanger 15; this increases the specific enthalpy gradient across the turbine 203 and consequently the utilization of the stored fluid. The conduction of the fluid through the bypass line 18, on the one hand, reduces the pressure losses in the flow path. On the other hand, the stored fluid may also be utilized when the flow path via the heat transfer apparatus 202 is not available, for example on account of serious damage to the gas turbo group. It should also be mentioned that, insofar as fluid is stored in the accumulator 201, the pressure accumulator expansion turbine 203 can be started without auxiliary energy only by opening the throttle member 7 and by acting upon the turbine 203 with accumulator fluid which is under pressure. To the highest advantage, in such a plant, the actuating members 7 and 17 are designed in such a way that manual actuation is possible.

Figure 9:
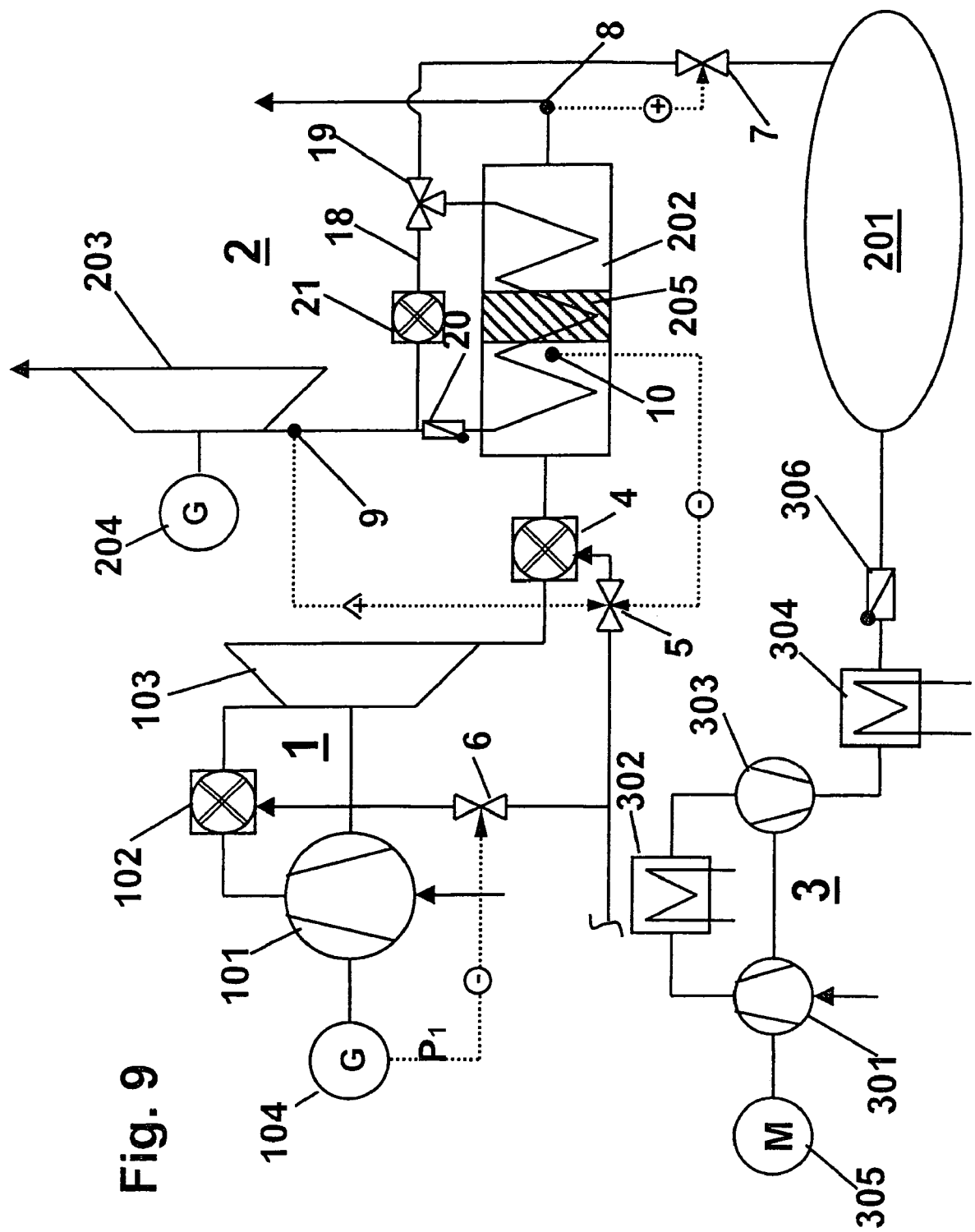
FIG. 9 illustrates another embodiment of the power plant and
FIG. 10 illustrates another embodiment of the power plant.

According to FIG. 9, an embodiment of the invention is illustrated in which the accumulator fluid additional heating device is designed as a bypass burner 21 arranged in the bypass line 18. Here, too, of course, indirect firing may be arranged, with the advantages described. However, illustrated direct firing by means of a bypass burner is substantially less capital-intensive to implement. On the premise that the bypass line and the bypass burner serve primarily for reserving emergency properties, here, for example, the use of a very simple pipe burner is a perfectly advantageous variant.

It may be mentioned, in this respect, that it is also possible to arrange the bypass line without further measures for supplying heat to the accumulator fluid. Although this results in a poorer utilization of the stored fluid, as described, the accumulator system can nevertheless, as a "stand-alone" solution, ensure emergency current supply as long as the pressure accumulator 201 is under pressure.

Figure 10:
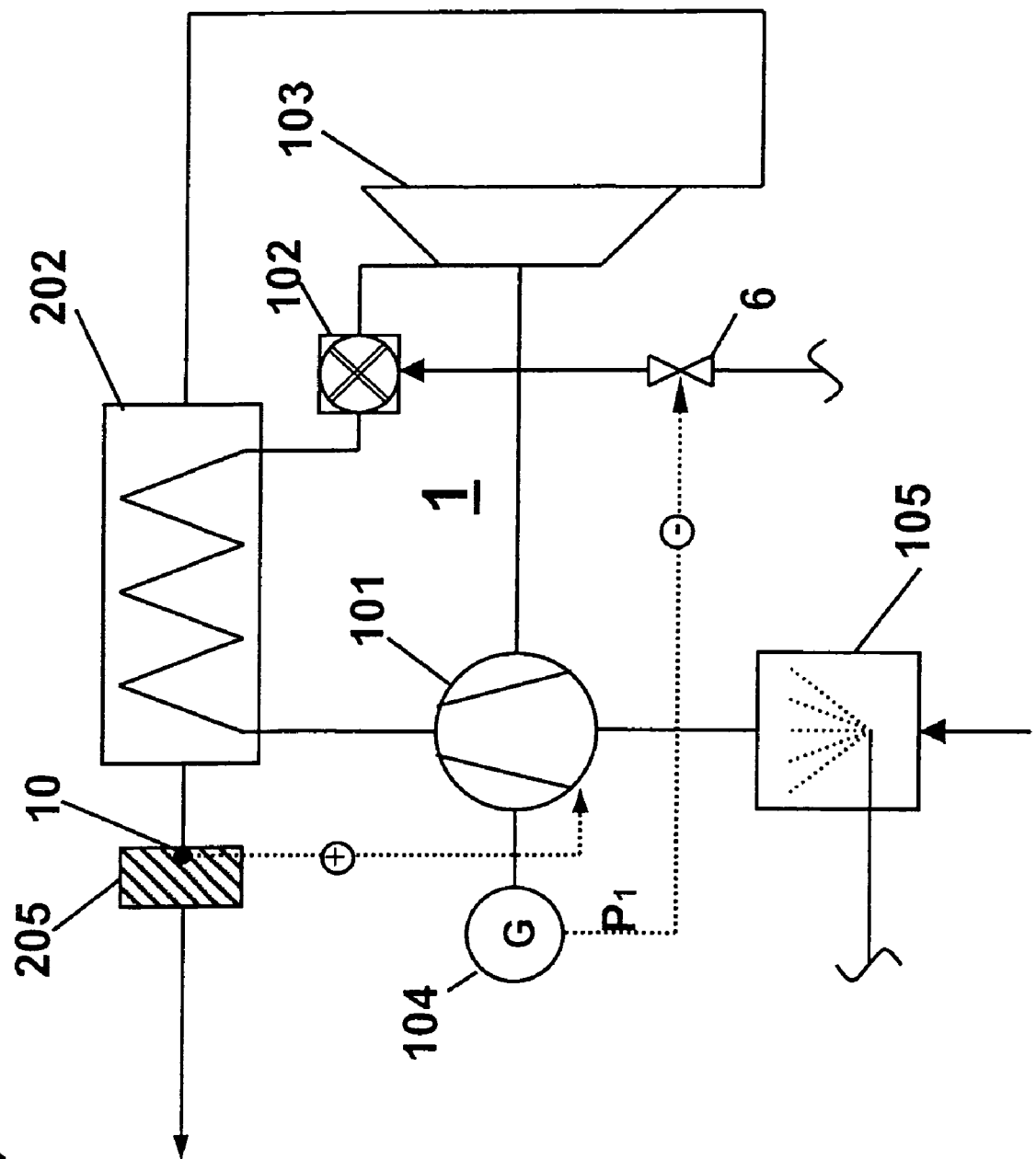

The embodiment according to FIG. 10 shows a further very simple embodiment of the invention. This is suitable, above all, in conjunction with gas turbo groups which have low final compressor temperatures of, for example, 250° C. to 350° C. on account of a comparatively low pressure ratio of 12 or 15 and below and/or because of the use of measures for cooling during compression or between two compression steps. In the gas turbo group 1 illustrated, a liquid is injected in an atomization device 105 into the air sucked in by the compressor 101. The water drops evaporate during compression and consequently reduce the temperature rise during compression. The compressed air flows through the secondary-side flow path of a heat transfer apparatus 202 and is at the same time heated in heat exchange with the hot gas of the gas turbo group which is flowing on the primary side. The heated air flows into the combustion chamber 102. Fuel is admixed and burnt there in a way known per se; the pressurized hot gases are expanded in the turbine 103 so as to perform work. The expanded smoke gases flow, still at a high temperature, into the heat exchanger 202, flow through the primary-side flow path of the latter and are cooled in heat exchange with the air flowing on the secondary side to a temperature which is compatible with the functioning of a catalyst, for example to around 270° C. to 370° C. The smoke gases flow through a smoke gas purification catalyst 205, are in this case purified of undesirable components and flow out as exhaust gas into the atmosphere. In a further embodiment, this smoke gas flow path may have arranged in it, downstream of the catalyst, a further heat exchanger in which the remaining exhaust gas heat is utilized. A measurement point 10 measures the catalyst temperature. With this temperature as controlled variable, the position of an adjustable front guide blade cascade, not illustrated, of the compressor 101 is controlled via a temperature controller, said front guide blade cascade being familiar to a person skilled in the art and determining primarily the mass flow of the gas turbo group. Independently of this, the position of the fuel mass flow actuating member 6 is controlled via a power controller in a known way. The arrangement illustrated likewise makes it possible to set the temperature of the catalyst to a desired value or within a desired value interval.

The above exemplary embodiments give a person skilled in the art an instructive idea of the diversity of embodiments and operating modes of a power plant of the type initially mentioned which are possible within the scope of the invention, while the exemplary embodiments illustrated are not to be and cannot be exhaustive. In particular, design features of the exemplary embodiments described may be combined with one another in virtually any desired way. The different regulation mechanisms described may be combined with one another in a single plant, and a change can be made between the different operating and regulating modes, even during operation.

LIST OF REFERENCE SYMBOLS

1 Gas turbo group
2 Pressure accumulator system
3 Charge device for pressure accumulator
4 Smoke gas heat supply device, additional firing
5 Fuel mass flow actuating member
6 Fuel mass flow actuating member
7 Shutoff and/or throttle member, accumulator fluid mass flow actuating member
8 Temperature measurement point, for exhaust gas temperature
9 Temperature measurement point, for accumulator fluid temperature downstream of the heater and/or at the inlet into the pressure accumulator expansion engine
10 Temperature measurement point, for smoke gas temperature upstream of a catalyst or for catalyst temperature
11 Coupling
12 Coupling
13 Overflow line
14 Shutoff and/or throttle member
15 Accumulator fluid additional heating device, heat exchanger
16 External firing
17 Fuel mass flow actuating member
18 Bypass line
19 Directional valve
20 Nonreturn member
21 Accumulator fluid additional heating device, accumulator fluid additional firing device, bypass burner
101 Compressor
102 Combustion chamber
103 Turbine
104 Electric machine, motor/generator unit, generator
105 Atomization device
201 Accumulator volume
202 Heat transfer apparatus
203 Accumulator fluid expansion engine, accumulator fluid expansion turbine
204 Generator
205 Catalyst
301 Compressor
302 Cooler and dehumidifier
303 Compressor
304 Cooler and dehumidifier
305 Drive motor
306 Nonreturn member
$P_1$ Generator power of the gas turbo group
$P_2$ Generator power of the pressure accumulator system

The invention claimed is:

1. A power plant, comprising a gas turbo group which includes:
   at least one compressor;
   at least one combustion chamber arranged downstream of the compressor;
   at least one turbine arranged downstream of the combustion chamber;
   a heat transfer apparatus, downstream of the first turbine, having a primary side arranged in a smoke gas path of the turbine and a secondary side arranged in a working fluid flow path for a gaseous working fluid;
   a smoke gas purification catalyst, arranged, in the smoke gas path of the gas turbo group within the heat transfer apparatus, downstream of a first part of the heat transfer apparatus and upstream of a second part of the heat transfer apparatus;
   a pressure accumulator;
   at least one accumulator fluid expansion tank connected to the pressure accumulator wherein the heat transfer apparatus is arranged, on the secondary side, in a fluid flow path leading from the pressure accumulator to the accumulator fluid expansion engine;
   at least one temperature measurement device for determining the smoke gas temperature of the catalyst inlet and/or the catalyst temperature; and a shutoff and/or throttle member arranged in the fluid flow path between the pressure accumulator and the accumulator fluid expansion engine;

wherein a temperature controller is connected up with the smoke gas temperature of the catalyst inlet and/or the catalyst temperature as controlled variable and with the position of the shutoff and/or throttle member as controlling variable.

2. A power plant, comprising a gas turbo group which includes:

at least one compressor;

at least one combustion chamber arranged downstream of the compressor;

at least one turbine arranged downstream of the combustion chamber;

a heat transfer apparatus, downstream of the first turbine, having a primary side arranged in a smoke gas path of the turbine and a secondary side arranged in a working fluid flow path for a gaseous working fluid;

a smoke gas purification catalyst, arranged, in the smoke gas path of the gas turbo group within the heat transfer apparatus, downstream of a first part of the heat transfer apparatus and upstream of a second part of the heat transfer apparatus;

a pressure accumulator;

at least one accumulator fluid expansion tank connected to the pressure accumulator wherein the heat transfer apparatus is arranged, on the secondary side, in a fluid flow path leading from the pressure accumulator to the accumulator fluid expansion engine;

at least one temperature measurement device for determining the exhaust gas temperature in the smoke gas path downstream of the heat transfer apparatus; and a shutoff and/or throttle member arranged in the fluid flow path between the pressure accumulator and the accumulator fluid expansion engine;

wherein a temperature controller is connected up with the exhaust gas temperature as controlled variable and with the position of the shutoff and/or throttle member as controlling variable.

3. A power plant, comprising a gas turbo group which includes:

at least one compressor;

at least one combustion chamber arranged downstream of the compressor;

at least one turbine arranged downstream of the combustion chamber;

a heat transfer apparatus, downstream of the first turbine, having a primary side arranged in a smoke gas path of the turbine and a secondary side arranged in a working fluid flow path for a gaseous working fluid;

a smoke gas purification catalyst, arranged, in the smoke gas path of the gas turbo group within the heat transfer apparatus, downstream of a first part of the heat transfer apparatus and upstream of a second part of the heat transfer apparatus;

a pressure accumulator; and at least one accumulator fluid expansion tank connected to the pressure accumulator wherein the heat transfer apparatus is arranged, on the secondary side, in a fluid flow path leading from the pressure accumulator to the accumulator fluid expansion engine, wherein a heat supply device, in particular an additional firing device, is arranged in the smoke gas path of the gas turbo group upstream of the heat transfer apparatus.

4. The power plant as claimed in claim 3, furthermore comprising;

at least one temperature measurement device for determining the smoke gas temperature of the catalyst inlet and/or the catalyst temperature;

wherein a temperature controller is connected up with the smoke gas temperature of the catalyst inlet and/or the catalyst temperature as controlled variable and with the position of a fuel mass flow actuating member of the heat supply device as controlling variable.

5. The power plant as claimed in claim 3, wherein a power controller of the accumulator fluid expansion engine is connected up with the position of a fuel mass flow actuating member of the heat supply device as controlling variable.

6. The power plant as claimed in claim 3, furthermore comprising: means for determining the accumulator fluid temperature downstream of the heat transfer apparatus, wherein a temperature controller is connected up with the accumulator fluid temperature as controlled variable and with the position of a fuel mass flow actuating member of the heat supply device as controlling variable.

7. A power plant, comprising a gas turbo group which includes:

at least one compressor;

at least one combustion chamber arranged downstream of the compressor;

at least one turbine arranged downstream of the combustion chamber;

a heat transfer apparatus, downstream of the first turbine, having a primary side arranged in a smoke gas path of the turbine and a secondary side arranged in a working fluid flow path for a gaseous working fluid;

a smoke gas purification catalyst, arranged, in the smoke gas path of the gas turbo group within the heat transfer apparatus, downstream of a first part of the heat transfer apparatus and upstream of a second part of the heat transfer apparatus;

a pressure accumulator; and at least one accumulator fluid expansion tank connected to the pressure accumulator wherein the heat transfer apparatus is arranged, on the secondary side, in a fluid flow path leading from the pressure accumulator to the accumulator fluid expansion engine, wherein a further accumulator fluid heat supply device is arranged in the accumulator fluid flow path downstream of the heat transfer apparatus and upstream of the accumulator fluid expansion engine.

8. The power plant as claimed in claim 7, furthermore comprising: means for determining the accumulator fluid temperature downstream of the further accumulator fluid heat supply device, wherein a temperature controller is connected up with the accumulator fluid temperature as controlled variable and with the position of a fuel mass flow actuating member of the further accumulator fluid heat supply device as controlling variable.

9. The power plant as claimed in claim 7, wherein a power controller of the pressure accumulator expansion turbine is connected up with the position of a fuel mass flow actuating member of the further heat supply device as controlling variable.

10. The power plant as claimed in claim 7, wherein means for regulating the temperature of the catalyst and/or the smoke gas temperature at the inlet into the catalyst.

11. A method comprising:

operating a power plant having a gas turbo group which includes:

at least one compressor;

at least one combustion chamber arranged downstream of the compressor;

at least one turbine arranged downstream of the combustion chamber;

a heat transfer apparatus, downstream of the first turbine, having a primary side arranged in a smoke gas path of the turbine and a secondary side arranged in a working fluid flow path for a gaseous working fluid;

a smoke gas purification catalyst, arranged, in the smoke gas path of the gas turbo group within the heat transfer apparatus, downstream of a first part of the heat transfer apparatus and upstream of a second part of the heat transfer apparatus;

a pressure accumulator;

at least one accumulator fluid expansion tank connected to the pressure accumulator wherein the heat transfer apparatus is arranged, on the secondary side, in a fluid flow path leading from the pressure accumulator to the accumulator fluid expansion engine; and a further accumulator fluid heat supple device arranged in the accumulator fluid flow path downstream of the heat transfer apparatus and upstream of the accumulator fluid expansion engine;

the method comprising regulating the temperature of a catalyst and/or a smoke gas temperature at an inlet into the catalyst.

* * * * *